United States Patent [19]

MacEachern et al.

[11] Patent Number: 5,132,926
[45] Date of Patent: Jul. 21, 1992

[54] TOKEN RING EQUALIZER

[75] Inventors: Stuart P. MacEachern, Uxbridge; Alan C. Marshall, Framingham; Howard C. Salwen, Newtonville, all of Mass.

[73] Assignee: Proteon, Inc., Westboro, Mass.

[21] Appl. No.: 586,415

[22] Filed: Sep. 21, 1990

[51] Int. Cl.⁵ .................. G06G 7/02; H03H 7/30; H04L 7/00; H03D 3/24
[52] U.S. Cl. ................... 364/825; 375/14; 375/118; 375/120
[58] Field of Search ............ 364/825, 724.2; 375/14, 375/15, 12, 11, 13, 4, 110, 118, 119, 120

[56] References Cited

U.S. PATENT DOCUMENTS

| | | | |
|---|---|---|---|
| 3,800,228 | 3/1974 | Acker | 375/12 |
| 3,813,598 | 5/1974 | Stuart | 375/118 |
| 3,878,468 | 4/1975 | Falconer et al. | 375/15 |
| 3,974,449 | 8/1976 | Falconer | 375/14 |
| 4,027,250 | 5/1977 | Lang | 375/13 |
| 4,253,184 | 2/1981 | Gitlin et al. | 375/14 |
| 4,320,526 | 3/1982 | Gitlin | 375/14 |
| 4,689,804 | 8/1987 | Srinivasagopalan et al. | 375/15 |
| 4,726,043 | 2/1988 | Levesque | 375/110 |
| 4,792,964 | 12/1988 | Toshida | 375/12 |
| 4,856,031 | 8/1989 | Goldstein | 375/11 |
| 4,953,186 | 8/1990 | Levy et al. | 375/14 |

Primary Examiner—Jerry Smith
Assistant Examiner—Jim Trammell
Attorney, Agent, or Firm—Schiller & Kusmer

[57] ABSTRACT

An improved local area network ring node of the type described in ANSI/IEEE Standard 802.5, including a receiver having an input connectable to the ring, a phase-locked loop circuit for extracting a clock frequency from the receiver output and including a phase detector for generating a phase error signal, and a data demodulator connected for demodulating at the extracted clock frequency the data in the receiver output. The improvement lies in the provision of a filter for deriving a control signal from the outputs of the data demodulator and the phase detector and an adaptive equalizer for reducing the effect of jitter in signals applied to the receiver input from the network, the equalizer comprising a filter network including a voltage variable impedance so connected as to vary responsively to the control signal.

6 Claims, 3 Drawing Sheets

TOKEN RING EQUALIZER

The present invention relates to local area networks and more particularly to an improved system for synchronous demodulation in nodes in a token-passing ring.

Local area networks are used to provide compatible interconnections among electronic data processors. A standard for a token-passing ring type of local area network is set forth in ANSI/IEEE Standard 802.5-1989 (An American National Standard; IEEE Standards for Local Area Networks) entitled *Token Ring Access Method and Physical Layer Specifications,* the same being incorporated herein by reference. A token-passing ring comprises a set of stations or nodes serially connected by a transmission medium in the form of an endless or closed loop, information being transferred sequentially in one direction along the loop, bit by bit, from one active node to the next. Each node generally is an interface unit serving as means for connecting one or more work stations, terminals, computers or the like to the ring so as to permit such nodes or the like to communicate with other nodes coupled to the ring. A node given access to the transmission medium, can transfer information onto the ring addressed to another station. The addressed node copies the information as it passes and when the information circulates back to the originator, the latter removes the information from the ring.

A node gains the right to transmit its information onto the medium when it detects a token passing through the medium, the token being a unique signal array that circulates through the medium following the transfer of a body of information. Any node may capture the token by modifying it, typically to a start-of-frame sequence and appending control and status fields, address fields, information fields, frame-check sequence and end-of-frame sequence. At the completion of information transfer, the node initiates and places a new token onto the ring, providing other nodes with an opportunity to gain access to the ring by capture of the token.

Clock and data bit information for token-passing rings are encoded into bit symbols by polarity-independent, differential Manchester coding in which each bit is transmitted for one half of its duration as a signal of one polarity and as a signal of opposite polarity for the remainder of that bit's duration. Signal transitions are then necessarily mid-bit transitions which provide inherent timing information through the transmission channel.

Each station or node in the ring includes means for performing a synchronization function in which signals received by the node are processed in a phase-locked loop to provide a reference which determines the sampling moment in a data demodulator. As is well known in the art, the phase-locked loop comprises a phase detector feeding a loop compensation network, the output of which is used to control the frequency of a voltage-controlled oscillator. The output of the voltage-controlled oscillator, essentially the extracted clock of the received data, is fed back to the phase detector, closing the loop. This type of circuit has been employed for many years to provide a synchronous demodulation function.

The signal arriving at each node is generally distorted or filtered by its passage through cabling interconnecting the ring nodes with one another. The effect of this filtering is to cause intersymbol interference among the received signals, typically manifested by shifts of the zero crossings of the received waveform, i.e., jitter. If the cable lengths vary randomly, the effect of the jitter is not deterministic and cumulative, but random also. Although the Manchester encoding technique is one of the least vulnerable to intersymbol interference because balance is ensured over every data bit, Manchester encoded signals exhibit particularly large shifts in their zero crossings when a long series of logical "ones" is followed by a long series of logical "zeros", and vice versa. Such jitter tends to cause errors to arise at the output of the phase detector, and such errors can cause the extracted clock signal generated at the output of the voltage-controlled oscillator to have the wrong phase. In turn, such phase error can cause the sampling moment in the data demodulator to be in error. Thus, the demodulation process can be seriously degraded by the presence of jitter caused by distortion of the Manchester encoded signals.

As is well known in the art, both the voltage-controlled oscillator and the phase detector should be linear over the dynamic range corresponding to the expected maximum deviation of the modulated signal. Similarly the loop compensation circuit should be selected to reduce the effect of accumulated noise in the system, to ensure that the phase-locked loop is capable of tracking the dynamic jitter which arrive with the input signals and to ensure stable operation of the phase-locked loop.

In 802.5 networks, long runs of "ones" are represented by rectangular waves at half the repetition rate of the data, while long runs of "zeros" are represented by rectangular waves at the data rate as is shown in FIG. 6A. The rectangular waves at the higher repetition rate tend to be more attenuated in the transmission cable medium. Consequently, efforts have been made to provide an adaptive filter which incorporates a resistor variable responsively to this difference in signal amplitude, and thus adjust the equalizer. Efforts to tailor the phase response correction provided by the equalizer by sensing the change in amplitude when long runs of "ones" and "zeros" are transmitted, have been shown to be imperfect.

Accordingly it is a primary object of the present invention to provide a networking node having improved equalization to overcome the effects of jitter. Another object of the present invention is to provide such nodes with an adaptive equalizer for reducing the effect of jitter in signals applied to the receiver input from the network, the equalizer comprising a filter including a voltage variable impedance so connected that the latter is varied responsively to a phase error signal provided by a phase detector in a phase-locked loop in the node.

The objects of the present invention are effected generally in an improved node in a local area network of the type described in ANSI/IEEE Standard 802.5, or a similar system, such network typically including a set of nodes serially connected to a transmission medium so that information bits may be transferred sequentially from one active node to the next. Each node has a receiver including an input connectable to the network and an output, a phase-locked loop circuit for extracting a clock frequency from the receiver output, each loop including a corresponding phase detector for providing a phase error signal, and a data demodulator connected for demodulating at the extracted clock frequency the data in the receiver output. Each node also includes means for deriving a control signal from the outputs of the corresponding data demodulator and phase detector, and equalizing means for reducing the effect of jitter in signals applied to the receiver input from the network, the equalizing means comprising filter means including a voltage variable impedance, and means for varying that impedance responsively to the control signal.

Other objects of the present invention will in part be obvious and will in part appear hereinafter. The invention accordingly comprises the apparatus possessing the construction, combination of elements and arrangement of parts which are exemplified in the following detailed disclosure and the scope of the application of which will be indicated in the claims. For a fuller understanding of the nature and objects of the present invention, reference should be had to the following detailed description taken in connection with the accompanying drawings wherein:

Figure 1:
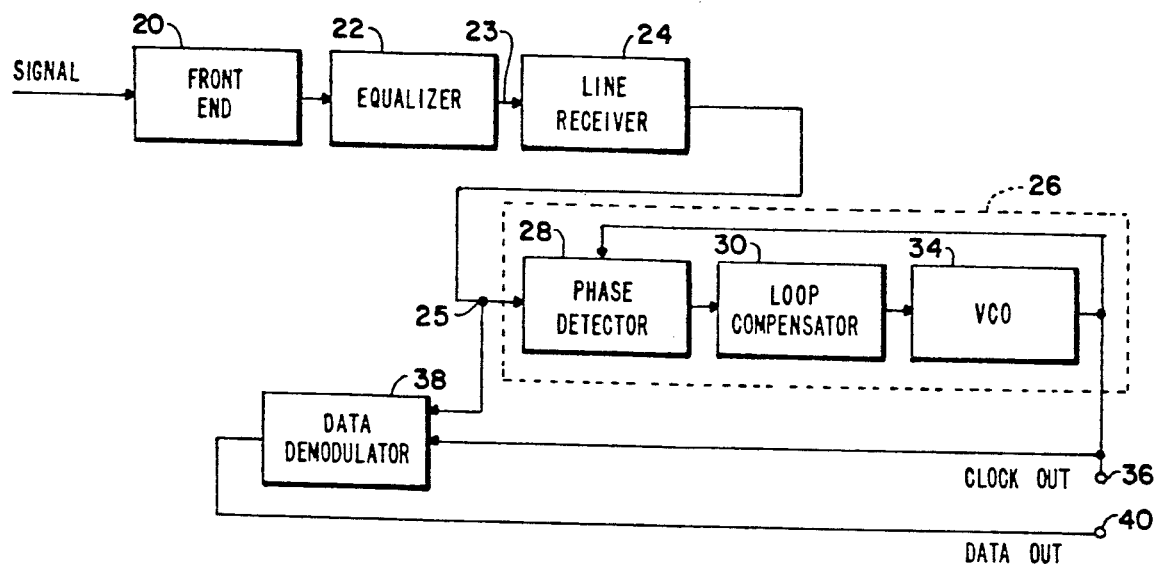
FIG. 1 is a schematic diagram of a circuit illustrating a prior art equalizer for nulling jitter caused by cable filtering in a token-passing ring.

Referring now to FIG. 1, there is shown a typical ring node meeting the requirements set forth for use in a token-passing type of local area network such as is described in ANSI/IEEE Standard 802.5. Such a network is characterized in comprising a set of nodes serially connected to a transmission medium so that information bits may be transferred sequentially from one active node to the next. The node shown in FIG. 1 typically comprises front end circuit 20 which includes components intended to provide circuit protection and thus includes isolators, diodes and shunting capacitors to confer surge protection on the system. The details of circuit 20 are well-known in the art and not being essential to the present invention, need not be further described here.

The output of circuit 20 is connected to the input of equalizer 22 which will be described in greater detail hereinafter. The output of equalizer 22 in turn is connected through line 23 to the input of line receiver 24. The latter is essentially an amplifier, the output of which tends to be noisy, distorted and jittering.

The output of receiver 24 is connected through line 25 to the input of phase-locked clock demodulator or loop 26. The latter serves to convert a noisy received analog signal to logic levels and an associated data clock. Phase-locked loop 26 typically comprises input phase detector 28, loop compensation network 30 and voltage-controlled oscillator 34. Phase detector 28 functions to compare two signals with one another to generate a phase-error signal representing a measure of the phase difference between the two input signals, one of which is the output signal from line receiver 24. Loop compensation network 30 is selected to meet certain criteria as earlier noted herein. Thus, the output of phase detector 28 is fed to loop compensation network 30 where the phase-error signal is filtered and provides an output signal that serves to control the frequency of the output signal provided by voltage-controlled oscillator 34. The output signal from oscillator 34 is fed back as the reference signal to phase detector 28.

It will be appreciated that the output of phase-locked loop 26 is a clock signal extracted from the data received by front end circuit 20. The extracted clock signal, appearing at clock output terminal 36, constitutes an input to data demodulator 38. Because the output of receiver 24 is also connected to the data input of data demodulator 38 and clock output terminal 36 is connected as another input to the demodulator, the clock signal serves as a reference to determine the sampling moment in the demodulator wherein the logical value of the received data from line receiver 24 is determined. The output signal from demodulator 38 is then the detected data which appears at data output terminal 40.

Figure 2:
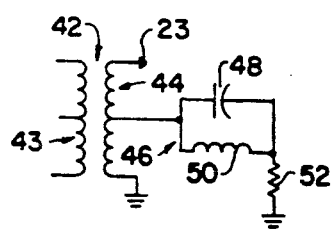
FIG. 2 is a schematic diagram of a circuit implementing the equalizer of FIG. 1.

Equalizer 22, shown in detail in FIG. 2, generally comprises input transformer 42, primary winding 43 of which is coupled to the ring or line to accept the signal through front end circuit 20, secondary winding 44 being connected between ground and input line 23. Secondary winding is tapped at an intermediate point so as to be connected to one side of RLC circuit 46. The latter comprises typically paralleled capacitor 48 and inductor 50 connected in series to ground through resistor 52. Resistor 52 is selected so that for a specific type and length of transmission cable for the network, the distortion created by the filtering effect of the cable, and hence jitter, tends to be nulled out at the output of phase detector 28 so that oscillator 34 can extract an accurate estimate of the received clock for use in the data demodulation process in demodulator 38. Unfortunately, because the cable type and length cannot, in a practical environment, always be predetermined or constrained, preselection of the value of resistor 52 is not readily accomplished to achieve equalization.

Figure 4:
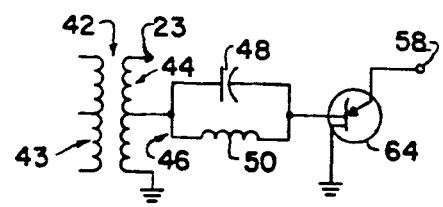
FIG. 4 is a schematic diagram of a circuit showing a type of adaptive equalizer for nulling jitter in the novel node of the present invention.
Figure 3:
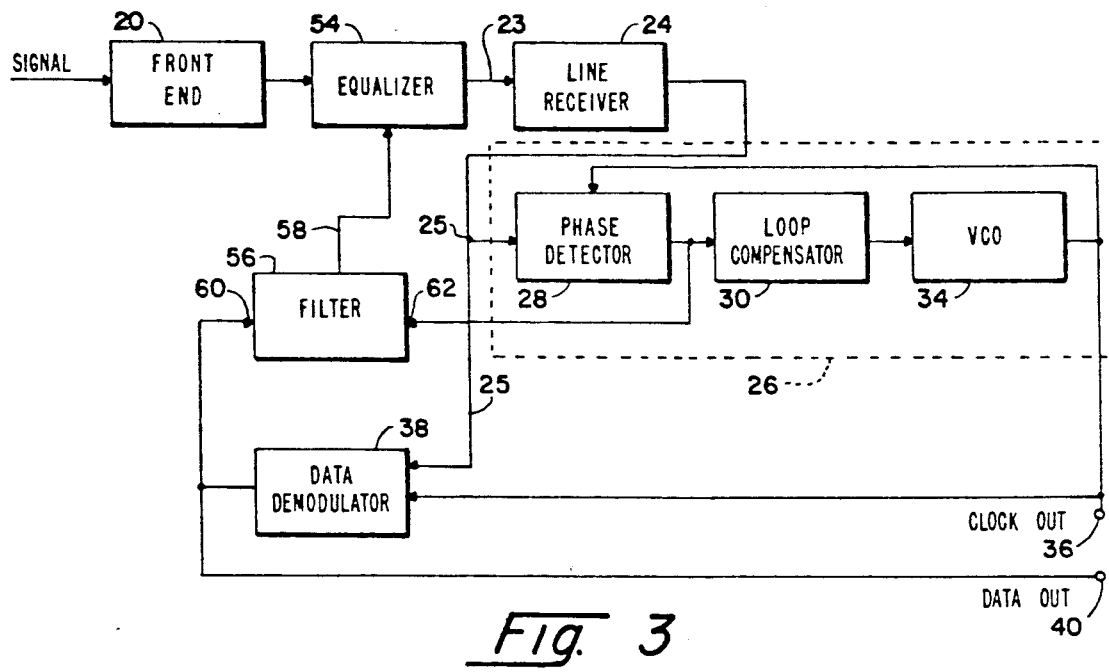
FIG. 3 is a block diagram of the circuit of a token-passing ring node embodying the principles of the present invention.
Figure 5:
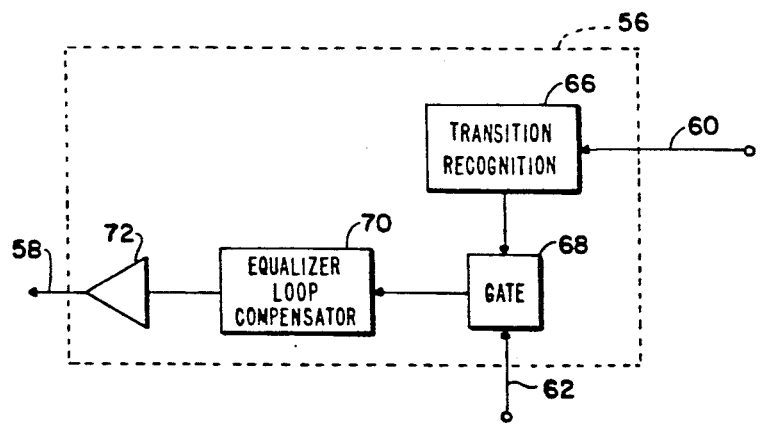
FIG. 5 is a block diagram of a filter designed for use in implementing the present invention.

The system thus described is an ordinary implementation for the IEEE 802.5 signal and has been used for many years to provide the synchronous demodulation function, so need not be further described. The present invention, as shown in FIGS. 3-5, constitutes an improvement on the foregoing system. The circuit of FIG. 3, wherein like numerals denote like parts, includes most of the elements of FIG. 1 but differs primarily in that it includes a novel equalization system. Thus the circuit of FIG. 3 includes equalizer 54 which functions adaptively. The circuit of FIG. 3 also comprises filter 56 having one input terminal 60 connected to data output terminal 40, and second input terminal 62 connected to line 25 from line receiver 24. The output terminal of filter 56 is connected to control input terminal 58 of equalizer 54.

Equalizer 54, shown in detail in FIG. 4, includes a variable impedance in the form of a variable resistor exemplified by field effect transistor (FET) 64, and means for varying the resistance provided by FET 64. Typically the gate of FET 64 is connected to control input terminal 58 and the drain and source are coupled between ground and the output of paralleled capacitor 48 and inductor 50. In order to adjust the value of the resistance provided by FET 64 responsively to a control signal applied at terminal 58, the circuit of FIG. 3 includes filter 56 shown in detail in FIG. 5. Filter 56 typically comprises transition recognition circuit 66, exemplified by a known type of logic circuit that changes state on sensing a predetermined data sequence, the logic circuit having its input connected to terminal 60 and its output connected to gate 68. Circuit 66 here preferably is triggered by a data pattern in which a stream of logical "ones" is followed by a stream of logical "zeros". Gate 68 is connected to sample an input signal applied at input terminal 62, the latter being connected to the output of phase detector 28. Thus, sampling will occur in gate 68 in accordance with gate control signals provided by the operation of circuit 66. The output of gate 68 is coupled to the input of compensation filter 70 which, being essentially an integrator, functions to average a large number of samples provided by gate 68. The output of filter 70 is connected through a gain stage such as amplifier 72. The output of the latter is connected as an input to terminal 58. It will be appreciated that the integrated output signal provided by filter 70 serves as a control signal to the gate of FET 64 of FIG. 4 and therefore adjusts the value of resistance provided by the FET. The gain of amplifier 72 scales the control signal to the proper level for feedback operation.

Figure 6:
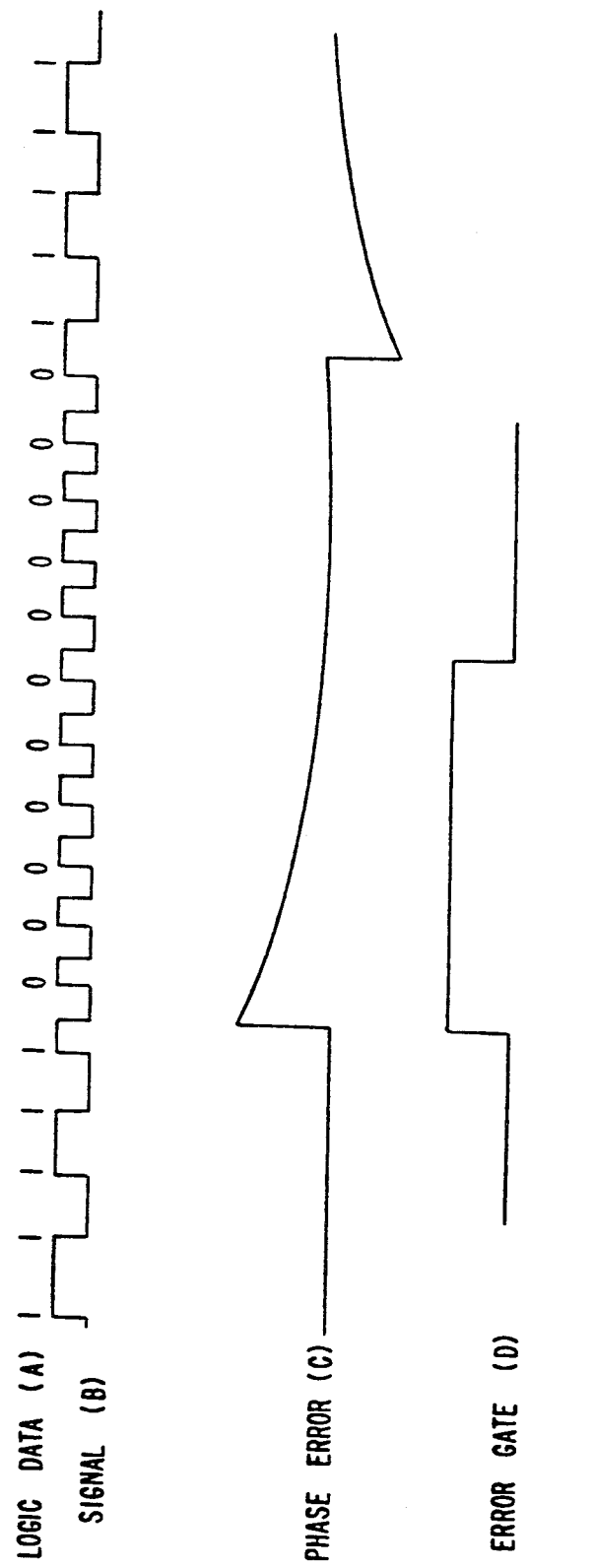
FIG. 6 is an idealized plot of a number of waveforms appearing at various points in the circuit of FIG. 3 during operation thereof.

FIG. 6A illustrates a sequence of logic values at output 40 and input 60. FIG. 6B is illustrative of such values in the form of an exemplary output signal train from data demodulator 38. As shown in FIG. 6C which illustrates the phase error at terminal 27, the long run of "ones", followed by a long run of "zeros", causes a step change in phase on the input signal. This phase change is degenerated or tracked out by phase-locked loop 26. The long run of zeros followed by a long run of ones, causes a phase step in the opposite direction, as also shown in FIG. 6C. Again the phase jump is tracked out by demodulator 26. This is the source of the information required for adjustment of the adaptive equalizer of the present invention. Using transition recognition circuit 66, the phase error is sensed only when a known transition has occurred. The logical data output signal is provided to gate 68 where a gate signal is created, as shown in FIG. 6D, which provides ones-to-zeros phase error data only. This gated phase error signal is then smoothed in filter 70 to create the voltage controlling FET 64, closing the equalization loop. In other words, the phase error in the vicinity of ones-to-zeros is fed back through a feedback loop compensation network in filter 56 to adjust the electronically controlled resistance of FET 64 which minimizes the phase error output of phase detector 28. This sequence of events ensures accurate timing of the sampling moment in data demodulator 38.

Since certain changes may be made in the above apparatus without departing from the scope of the invention herein involved, it is intended that all matter contained in the above description or shown in the accompanying drawings shall be interpreted in an illustrative and not in a limiting sense. For example, it will be appreciated that the novel circuit herein described and claimed can be located at either end of the medium interface connector (i.e., MIC, as defined particularly in Sec. 7 of ANSI/IEEE Std. 802.5-1989), e.g., either at a station per se or a trunk coupling unit (TCU). Consequently, the term "node" as used herein is intended to be applied to both locations.

What is claimed is:

1. In a local area network ring node having a receiver with an input and an output, means for coupling the input of said receiver to said network, a phase-locked loop circuit for extracting a clock frequency for said receiver output and including a phase detector for providing a phase error signal, and a data demodulator connected for demodulating at the extracted clock frequency the data in said receiver output, the improvement wherein:

said means for coupling comprises equalizing means for reducing the effect of jitter in signals applied to said receiver input from said network, said equalizing means comprising a filtering network including an impedance variable in response to a control signal; and filter means for deriving said control signal from the outputs of said data demodulator and said phase detector.

2. In a local area network ring node as defined in claim 1 wherein said filter means comprises means for generating gating signals responsively to specific data patterns in said data, gating means for gating said phase error signal in accordance with said gating signals to generate gated output signals, and means for integrating said gated output signals to provide said control signal.

3. In a local area network ring node as defined in claim 2 wherein said impedance is a variable resistance.

4. In a local area network ring node as defined in claim 3 in which said variable resistance is a field effect transistor, the gate of which is connected to accept said control signal from said means for integrating.

5. In a local area network ring node as defined in claim 1 wherein said phase-locked loop comprises a loop compensation network having its input connected to the output of said phase detector, and a voltage-controlled oscillator connected so as to provide a signal variable responsively to the output of said loop compensation network.

6. In a local area network ring node as defined in claim 1 wherein said node is of the type specified in ANSI/IEEE Standard 802.5-1989.

* * * * *